Jan. 22, 1963  E. G. FAHLMAN ETAL  3,074,769
PISTON AND RING CARRIER THEREFOR
Filed May 8, 1962  2 Sheets-Sheet 1

INVENTORS
EVERETT G. FAHLMAN &
BY GAVIN O. BROWN
Evans & Pearne
Attorneys

Jan. 22, 1963 E. G. FAHLMAN ETAL 3,074,769
PISTON AND RING CARRIER THEREFOR
Filed May 8, 1962 2 Sheets-Sheet 2

INVENTORS:
EVERETT G. FAHLMAN &
BY GAVIN O. BROWN

Attorneys

3,074,769
PISTON AND RING CARRIER THEREFOR
Everett G. Fahlman and Gavin O. Brown, Medina, Ohio, assignors to The Permold Company, Medina, Ohio, a corporation of Ohio
Filed May 8, 1962, Ser. No. 193,214
7 Claims. (Cl. 309—14)

This invention relates to pistons of aluminum or aluminum alloys hereinafter termed "aluminum pistons," in which a ring carrier insert is provided in the head of the piston. This application is a continuation in part of Serial No. 126,084, filed July 24, 1961 and now abandoned.

To prolong the life of the aluminum pistons in internal combustion engines, ring carriers of a metal harder than the piston metal have been provided. If the aluminum piston does not have a ring carrier, the hammering of the piston ring in the ring groove tends to widen the groove in the piston thereby reducing the effectiveness of the seal and shortening the life of the piston. To minimize this tendency of the groove to be widened by the pounding of the ring, inserts of harder metals than the piston alloy have been embedded in pistons during casting of the piston so that the impact of the ring in its groove will be absorbed by the harder carrier insert rather than the softer piston alloy.

While the use of such inserts resulted in reduced wear on the piston due to widening of the ring grooves, other problems were created. One was that since the carrier was generally made of a material with lower heat conductivity than the piston alloy, there was a tendency for heat not to be readily conducted from the piston thereby causing heat to build up in the head of the piston. The heat dissipation problem was overcome by employing carriers having cutout portions into which the piston alloy was cast during the piston-forming operation. In this way, a portion of the piston alloy directly contacted the piston ring itself.

Although heat dissipation of the piston was improved, in some cases, failure of the piston resulted because of breaking loose of portions of the ring carrier which were reduced in cross-section adjacent to the cutouts.

Another problem was maintaining the carrier insert tightly anchored or locked in the piston. Various carrier designs were proposed employing particular cutout configurations to improve the bonding of the carrier to the piston. However, many of these designs required special and/or costly manufacturing techniques and resulted in decreased piston metal contact area which reduced the desired heat dissipation.

The principal object of the present invention is to provide a piston having a ring carrier cast therein which will provide the combination of improved wear resistance and high level heat dissipation, while maintaining the carrier secured within the piston to greatly reduce the chance of damage due to possible ring carrier failure.

Another object of the invention is to provide a piston ring carrier which will be more securely held in a piston and which will improve the wear resistance of pistons while maintaining a high level of heat dissipation therein.

A further object of the invention is to provide a piston ring carrier blank which may be molded into a piston to accomplish the above objectives and which can be manufactured without special or costly techniques.

These and other objectives and advantages of the invention will be more fully understood from the following detailed description of the accompanying drawings, in which:

FIGURE 1 is a perspective view of a piston ring carrier in its finished condition as it exists after being embedded in a cast piston and after the cast piston and ring carrier blank have been machined or finish-ground (the piston itself not being shown but the areas of contact with the piston metal being indicated by stippling).

FIGURES 2 and 3 are fragmentary, vertical sectional views of the finished ring carrier of FIGURE 1, the planes of the sections being respectively indicated by the lines 2—2 and 3—3 in FIGURE 4.

Figure 7:
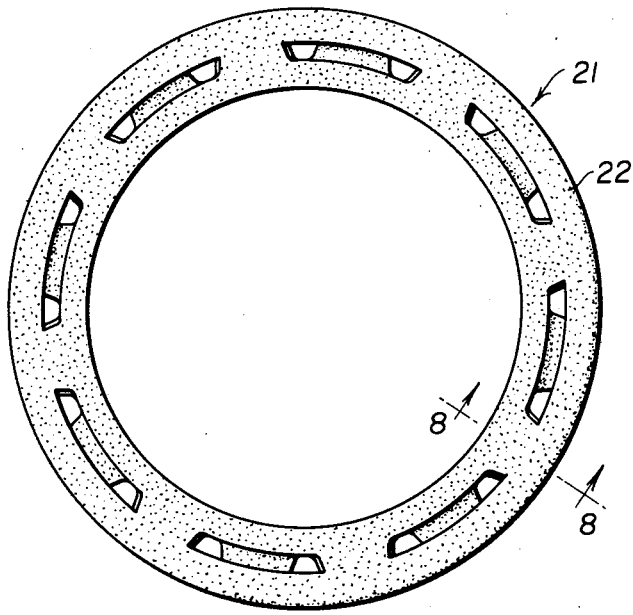
FIGURE 7 is a top plan view of a ring carrier blank as cast, before being embedded in a piston.
Figure 8:
FIGURE 8 is a fragmentary, vertical sectional view of the carrier blank shown in FIGURE 7, the plane of the section being indicated by the line 8—8 in FIGURE 7.

As shown in the drawings, the final ring carrier, generally designated 10, is preferably formed by casting an annular blank of the configuration shown in FIGURES 7 and 8, positioning the blank in a piston mold, pouring the piston metal into the mold so as to embed the blank in the rough cast piston, machining a piston ring groove in the blank to its final dimensions, and then machining or grinding the piston and blank to their final outside dimensions. When such a procedure is followed, the resulting piston ring carrier has a configuration within the finished piston as shown in FIGURES 1–4. The stippled surfaces in these figures are the rough-cast surfaces of the original blank and are engaged by and bonded to the piston metal in the finished product, and the non-stippled surfaces are those resulting from the finishing operations after the piston has been cast with the blank embedded therein.

As shown in FIGURES 1–4, the final ring carrier is of generally annular configuration and has a circumferentially continuous inner portion 11 with a circumferential piston ring groove 12 formed therein. Spaced ears 13 and 14 extend outwardly from the continuous inner portion 11 with one series of ears being disposed on each side of the piston ring groove. The series of ears 13 on one side of the groove are circumferentially staggered relative to the other series of ears 14 on the opposite side of the groove. When the carrier is cast into the piston 16, the metal of the piston flows into and fills the space between the carrier ears of each series.

Figure 1:
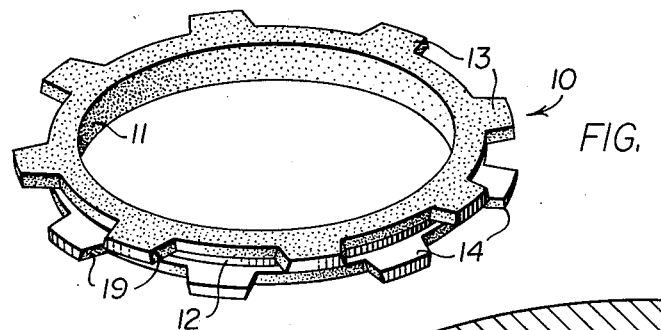
Figure 2:
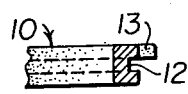
Figure 5:
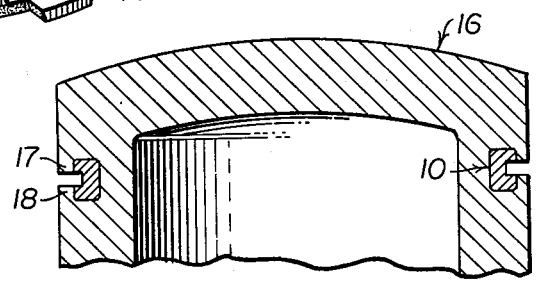
FIGURES 5 and 6 are fragmentary, vertical sectional views of a finished piston having the finished ring carrier of FIGURE 1 embedded therein, the planes of the sections corresponding; respectively, to the planes of the sections shown in FIGURES 2 and 3.
Figure 3:
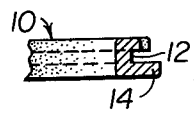
Figure 6:
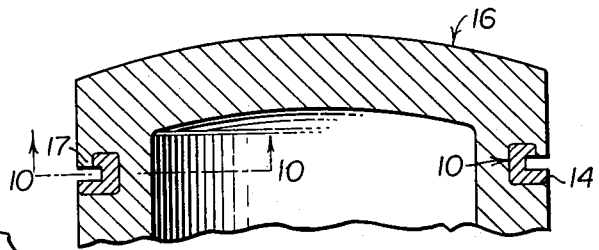
Figure 4:
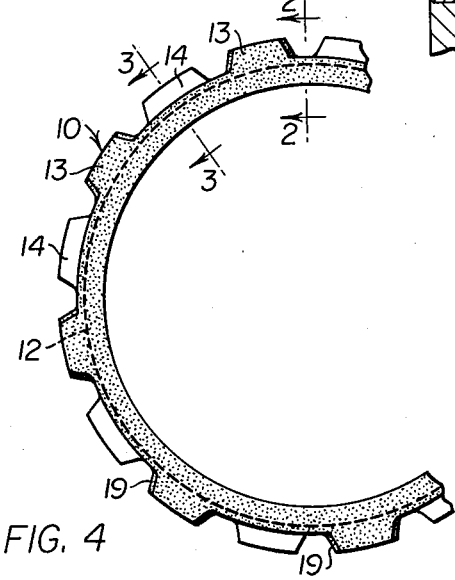
FIGURE 4 is a top plan view of the finished carrier shown in FIGURE 1.

As shown in FIGURES 5 and 6, the circumferentially spaced segmental portions 17 and 18 of the piston metal fill the spacing between the series of carrier ears 13 and 14, respectively, and form part of the side walls of the piston ring groove 12. During service, the piston ring (not shown) contacts the piston metal segments 17 and 18, as well as the ears 13 and 14, so that the dissipation of heat from the ring to the side wall of the piston is facilitated by the relatively high conductivity of the piston metal. Since these segments 17 and 18 are of substantial size as compared with the ears 13 and 14, the heat from the piston ring and from the head of the piston is dissipated relatively quickly.

While the piston metal segments 17 and 18 facilitate the dissipation of heat from the piston ring and head, the ears 13 and 14 and the continuous inner portion 11, being of a metal harder than the metal of the piston, provide a hard wearing surface to substantially reduce the wear caused by the hammering of the piston ring against the sides of the groove when the piston is in service.

To minimize the possibility of piston failure due to breaking out of portions of the carrier, the side edges 19 of ears 13 and 14 converge radially outwardly from the continuous inner portion 11 to the outer periphery of the carrier. Advantageously, the total area of the piston metal segments 17 or 18 on either side of the piston ring groove is at least equal to the area of that portion of the carrier which forms the ears 13 or 14 on that side of the groove. Preferably this piston metal area is closer to 150%, as shown in the drawings, and may be as great as 300% of the area of that portion of the carrier which forms the ears 13 or 14 on either side of the groove.

The foregoing proportions are based upon a minimum radial depth of the carrier groove (between the ears) that is about 38% of the maximum depth of the carrier groove (at the ears). If this minimum depth is decreased while retaining the same maximum depth and without altering the shape, width, and circumferential spacing of the carrier ears 13 and 14, it is obvious that the area of the piston metal segments 17 in contact with a piston ring seated in the groove will increase, but that the strength and rigidity of the carrier and its effectiveness to resist wear will both decrease. Therefore, the proportions of the total piston ring contact area of the groove side walls that are composed of piston metal and carrier metal, respectively (rather than the above-mentioned proportions of piston metal area to carrier ear area), constitute a more meaningful basis for defining the practical and preferred limits of the invention as regards the size and spacing between the carrier ears 13 and 14.

Figure 10:
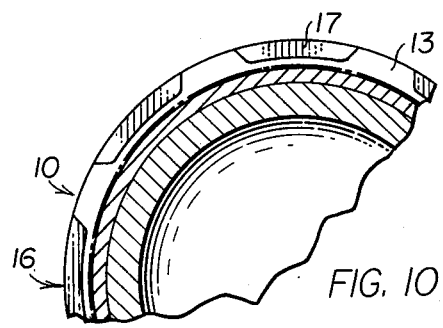
FIGURE 10 is a fragmentary, horizontal sectional view of the finished piston having the finished ring carrier of FIGURE 1 embedded therein and showing by surface shading the surface areas of piston metal that are exposed to contact by a piston ring, the plane of the section being indicated by the line 10—10 in FIGURE 6.

The dot-dash arc in FIGURE 10 represents the inner periphery of a piston ring, which is only slightly spaced from the bottom of the groove by an amount that commonly varies only slightly in different types of engines. It will be apparent that most of the radial depth of the groove side walls between the ears (i.e. most of the 38% of the maximum depth referred to above) is in engagement with the piston ring about its entire circumference and constitutes a contact area between the carrier and piston ring of relatively low heat conductivity. The groove depth inwardly of the piston ring itself is such a small part of the total depth that, for greater convenience in stating the reasonable limits of the invention, the entire side wall area of the piston ring groove may be considered as the total effective heat conducting area in defining the relative proportions of the total that should be formed of piston metal segments 17 between the carrier ears 13 or 14.

Thus the practical and preferred limits of the invention, which will take into account the many possible variations in configuration and depth, as well as width, of the carrier ears 13 and 14, are most conveniently expressed in terms of the percentage of the total groove side wall area that is composed of piston metal. Using this standard, the total area of the piston metal segments 17 on either or both sides of the piston ring groove is desirably between a minimum of about 32% and a maximum of about 45% of the total groove side wall area on either or both sides of the groove. Preferably this range is from about 40% to about 43%. In the particular embodiment disclosed, which is drawn closely to scale from a preferred example in commercial production, the piston metal segments 17 constitute about 41.5% of the total groove side wall area.

Figure 9:
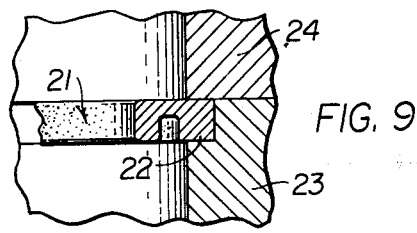
FIGURE 9 is a fragmentary, vertical sectional view of the carrier blank illustrated in FIGURES 7 and 8, showing the blank positioned in a piston mold.

FIGURES 7, 8, and 9 show a carrier blank 21, suitably formed as a casting, from which the carrier 10 of FIGURES 1–6 may be formed by the proper finishing operations, e.g., grinding, machining, etc., after the blank has been embedded in a piston. The outer portion 22 of the blank serves as a guide to properly position the blank within the mold prior to and during the molding of the piston. As shown in FIGURE 9, the blank 21 is positioned in the mold with the outer portion 22 of the blank resting on a step or recess in the lower piston mold 23. The upper mold 24 is then placed over the blank 21 and mold 23 to secure the blank in the proper position during the molding operation. After the piston has been molded, the outer portion 22 is removed together with the rough outer surface of the piston by suitable finishing operations.

While the outer portion 22 of the blank 21 is shown in the drawings as a continuous annular ring, if desired, the outer portion may be divided into segments. Alternatively, the portion 22 may be replaced by a plurality of outwardly extending fins or projections to provide the proper positioning of the blank within the mold.

The ring carrier of the present invention is made from a metal which is harder than the metal of the piston. Since the pistons are commonly made from aluminum, aluminum alloys, or other soft metals, the carrier may be made of iron or steel or an aluminum alloy which is harder than the piston metal such as a hypereutectic aluminum-silicon alloy. Advantageously, the carrier is made of cast iron.

The above description and specific examples show that the piston ring carrier of the present invention provides a combination of features which produces results heretofore unattainable. Since the contact area of the piston metal with the ring is large, the dissipation of heat from the ring and the head of the piston is maintained at a high level. Also, the configuration and positioning of the ears with respect to the continuous inner portion provides a sufficiently large wear-resisting area so that long piston life is achieved. Moreover, the positioning and configuration of the ears with respect to the continuous inner portion results in the carrier having high strength and rigidity. This is due in part to the reduction in the size of the areas of small cross-section. Furthermore these advantages and features are achieved in a carrier which is relatively inexpensive to manufacture without requiring special techniques.

From the foregoing description of the invention, it will be apparent that various modifications in the piston and piston ring carrier described can be made within the scope of the invention. Therefore, the invention is not intended to be limited to the details of construction and manufacture specifically disclosed herein except as may be required by the appended claims.

What is claimed is:

1. A cast metal piston having a substantially cylindrical side wall, a concentric piston ring carrier embedded within said piston and extending outwardly toward said side wall, said ring carrier being formed of a metal harder than the metal of said piston and shaped to provide a circumferentially continuous inner portion and an outwardly opening circumferential piston ring groove therein, circumferentially spaced ears extending outwardly from the continuous inner portion of said ring carrier, one series of such ears being disposed on each side of said piston ring groove, the series of ears on one side of said groove being circumferentially staggered relative to the series on the other side of the groove, and the metal of said piston being disposed within the space between the ears of each series to form circumferentially spaced piston metal areas in the planes of the side wall surfaces of said piston ring groove as a part thereof.

2. A cast metal piston according to claim 1 in which said spaced piston metal areas constitute from about 32% to about 45% of the total side wall area of the resulting groove.

3. A cast metal piston having a substantially cylindrical side wall, a concentric piston ring carrier embedded within said piston and extending outwardly toward said side wall, said ring carrier being formed of a metal harder than the metal of said piston and shaped to provide a circumferentially continuous inner portion and an outwardly opening circumferential piston ring groove therein, circumferentially spaced ears extending outwardly from the continuous inner portion of said ring carrier, one series of such ears being disposed on each side of said piston ring groove, the series of ears on one side of said groove being circumferentially staggered relative to the series on the other side of the groove and the side edges of said ears converging radially outwardly, and the metal of said piston being disposed within the space between the ears of each series to form circumferentially spaced piston metal areas in the planes of the side wall surfaces of said piston ring groove as a part thereof.

4. A cast metal piston having a substantially cylindrical side wall, a concentric piston ring carrier embedded within said piston and extending outwardly toward said side wall, said ring carrier being formed of a metal harder than the metal of said piston and shaped to provide a circumferentially continuous inner portion and an outwardly opening circumferential piston ring groove extending into said continuous inner portion, circumferentially spaced ears extending outwardly from the continuous inner portion of said ring carrier, one series of such ears being disposed on each side of said piston ring groove, the series of ears on one side of said groove being circumferentially staggered relative to the series on the other side of the groove, and the metal of said piston being disposed within the space between the ears of each series to form circumferentially spaced piston metal areas in the planes of the side wall surfaces of said piston ring groove as a part thereof.

5. A cast metal piston having a substantially cylindrical side wall, a concentric piston ring carrier embedded within said piston and extending outwardly toward said side wall, said ring carrier being formed of a metal harder than the metal of said piston and shaped to provide a circumferentially continuous inner portion and an outwardly opening circumferential piston ring groove extending into said continuous inner portion, circumferentially spaced ears extending outwardly from the continuous inner portion of said ring carrier, one series of such ears being disposed on each side of said piston ring groove, the series of ears on one side of said groove being circumferentially staggered relative to the series on the other side of the groove and the side edges of said ears converging radially outwardly, and the metal of said piston being disposed within the space between the ears of each series to form circumferentially spaced piston metal areas in the planes of the side wall surfaces of said piston ring groove as a part thereof.

6. A cast metal piston according to claim 5 in which said spaced piston metal areas constitute from about 32% to about 45% of the total side wall area of the resulting groove.

7. A cast metal piston according to claim 5 in which said spaced piston metal areas constitute from about 40% to about 43% of the total side wall area of the resulting groove.

References Cited in the file of this patent

UNITED STATES PATENTS

| | | |
|---|---|---|
| 2,851,318 | Smith et al. | Sept. 9, 1958 |
| 2,956,847 | Daub | Oct. 18, 1960 |
| 2,996,341 | Daub | Aug. 15, 1961 |
| 2,996,342 | Daub | Aug. 15, 1961 |